United States Patent

Kreamalmyer

(10) Patent No.: US 9,125,390 B1
(45) Date of Patent: Sep. 8, 2015

(54) MULTIPLE HOOK CATFISH DIP WORM

(71) Applicant: William E. Kreamalmyer, West Burlington, IA (US)

(72) Inventor: William E. Kreamalmyer, West Burlington, IA (US)

(*) Notice: Subject to any disclaimer, the term of this patent is extended or adjusted under 35 U.S.C. 154(b) by 219 days.

(21) Appl. No.: 13/933,536

(22) Filed: Jul. 2, 2013

(51) Int. Cl.
*A01K 83/06* (2006.01)
*A01K 85/01* (2006.01)
*A01K 85/00* (2006.01)

(52) U.S. Cl.
CPC ............. *A01K 85/00* (2013.01); *A01K 83/06* (2013.01); *A01K 85/01* (2013.01)

(58) Field of Classification Search
CPC ........ A01K 83/06; A01K 85/01; A01K 97/02
USPC ................. 43/44.2, 44.4, 44.8, 42.06, 44.99, 43/42.36, 42.1, 42, 41, 41.2
See application file for complete search history.

(56) References Cited

U.S. PATENT DOCUMENTS

| | | | | |
|---|---|---|---|---|
| 218,345 A * | 8/1879 | Wakaman | ............ | 43/42.06 |
| 856,867 A * | 6/1907 | Hayward | ............ | 43/41 |
| 890,549 A * | 6/1908 | Zamel | ............ | 43/42.1 |
| 1,508,111 A * | 9/1924 | Meyer | ............ | 43/42.1 |
| 2,016,960 A * | 10/1935 | Dillon | ............ | 43/42.1 |
| 2,102,739 A * | 12/1937 | Peters | ............ | 43/41 |
| 2,136,713 A * | 11/1938 | Schnabel | ............ | 43/42.1 |
| 2,214,360 A * | 9/1940 | Woodley | ............ | 43/42.1 |
| 2,261,068 A * | 10/1941 | Mackovich | ............ | 43/42.1 |
| 2,306,181 A * | 12/1942 | Neumann | ............ | 43/42.1 |
| 2,513,548 A * | 7/1950 | Buss | ............ | 43/44.8 |
| 2,590,461 A * | 3/1952 | Rasch | ............ | 43/42.1 |
| 2,600,314 A * | 6/1952 | Miner | ............ | 43/41 |
| 2,718,086 A * | 9/1955 | Miner | ............ | 43/42.06 |
| 2,820,314 A * | 1/1958 | Scott | ............ | 43/42.1 |
| 2,922,247 A * | 1/1960 | Buss | ............ | 43/44.8 |
| 2,971,285 A * | 2/1961 | Murawski | ............ | 43/42.06 |
| 2,987,844 A * | 6/1961 | Hill | ............ | 43/42.06 |
| 3,047,975 A * | 8/1962 | Pretorius | ............ | 43/42.06 |
| 3,186,123 A * | 6/1965 | Freeman | ............ | 43/42.1 |
| 3,224,133 A * | 12/1965 | Emard | ............ | 43/42.36 |
| 3,230,656 A * | 1/1966 | Kozjak | ............ | 43/42.1 |
| 3,440,757 A * | 4/1969 | McClellan | ............ | 43/42.36 |
| 3,621,600 A * | 11/1971 | Dworski | ............ | 43/42.06 |
| 3,688,430 A * | 9/1972 | Balch | ............ | 43/42.06 |
| 3,768,194 A * | 10/1973 | Murray | ............ | 43/42.1 |
| 3,778,920 A * | 12/1973 | Anton et al. | ............ | 43/44.4 |
| 3,854,234 A * | 12/1974 | Hardin | ............ | 43/42.06 |
| 3,899,847 A * | 8/1975 | Dworski | ............ | 43/42.36 |
| 3,914,895 A * | 10/1975 | Mize | ............ | 43/42.06 |
| 3,938,275 A * | 2/1976 | Fukushima | ............ | 43/42.06 |
| 3,991,504 A * | 11/1976 | Pieper | ............ | 43/42.06 |
| 4,603,502 A * | 8/1986 | MacDonald | ............ | 43/42.06 |
| 4,788,788 A * | 12/1988 | Brockett | ............ | 43/44.99 |
| 4,817,325 A * | 4/1989 | Thomas | ............ | 43/42.1 |

(Continued)

*Primary Examiner* — Darren W Ark

(57) ABSTRACT

The multiple hook catfish dip worm is constructed of a worm body that is particularly adapted to prolong adhesion of stinky cheese bait that is otherwise washed off of during use in water as a fishing lure. The worm body is of tubular construction, and features a plurality of ribs along a length, and is made of a highly flexible material. The worm body includes a hook member that is concentrically aligned with and spans along the length of the worm body. Treble hooks extend radially from the hook member, and exit through the worm body. The worm body includes the treble hooks at various locations along the length of the worm body, and increases the likelihood of hooking a fish biting the worm body. The hook member includes a looped end, which enables a line to connect thereto.

7 Claims, 7 Drawing Sheets

(56) References Cited

U.S. PATENT DOCUMENTS

| | | | |
|---|---|---|---|
| 4,827,657 A * | 5/1989 | Slehofer | 43/44.2 |
| 4,914,851 A * | 4/1990 | Acker | 43/42.41 |
| 4,961,280 A * | 10/1990 | Hudson | 43/44.99 |
| 5,174,058 A * | 12/1992 | Boyer | 43/44.8 |
| 5,216,829 A * | 6/1993 | Morton | 43/42.06 |
| 5,274,947 A * | 1/1994 | Griffiths | 43/44.8 |
| 5,299,378 A * | 4/1994 | Ballard | 43/42.06 |
| 5,603,182 A * | 2/1997 | Wilson | 43/44.99 |
| 5,950,351 A * | 9/1999 | Walker et al. | 43/44.2 |
| 6,115,956 A * | 9/2000 | Firmin | 43/42.06 |
| 6,240,672 B1 * | 6/2001 | Huppert | 43/44.8 |
| 6,247,260 B1 * | 6/2001 | Kandlbinder et al. | 43/44.4 |
| 6,412,214 B1 | 7/2002 | Sebastiani | |
| D463,004 S | 9/2002 | Sims et al. | |
| 6,871,442 B2 * | 3/2005 | Wyatt | 43/44.4 |
| 6,922,937 B1 | 8/2005 | Gilbert | |
| 7,024,813 B2 * | 4/2006 | Griss | 43/44.2 |
| 7,131,233 B1 | 11/2006 | Preston | |
| 7,469,497 B2 * | 12/2008 | Hergott | 43/42.1 |
| 8,020,338 B2 * | 9/2011 | Brown | 43/42.06 |
| 2005/0028424 A1 | 2/2005 | Poinski | |
| 2010/0281755 A1 * | 11/2010 | Armour | 43/42.06 |
| 2014/0208632 A1 * | 7/2014 | Rhoda | 43/44.8 |

\* cited by examiner

MULTIPLE HOOK CATFISH DIP WORM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of fishing, more specifically, a catfish dip worm.

A catfish will eat just about anything. They are primarily bottom feeders, but they will also feed on the surface as well. Catfish eat live bait also, however, keeping your bait alive long enough in the hot summer months is a problem. Those who fish for channel catfish prefer a concoction known as stinky cheese dip bait. This product is kept in a plastic tub with a lid. A fisherman will submerge the catfish lure into the stinky cheese bait, and cast said lure into the water. As the stinky cheese bait washes off in the water, the stinky cheese bait attracts channel catfish. Catfish follow the scent upstream to its source, the lure, and attempt to consume it.

B. Discussion of the Prior Art discloses a multiple hook catfish dip worm that includes a worm body of tubular construction, and features a plurality of ribs along a length; wherein the worm body is made of a highly flexible material, and when dipped into a stinky cheese bait utilizes said ribs to prolong the time with which the stinky cheese bait resides before washing off in the water being fished; wherein the worm body includes a hook member that is concentrically aligned with and spans along the length of the worm body; wherein treble hooks extend radially from the hook member, and exit through the worm body; wherein the worm body includes the treble hooks at various locations along the length of the worm body; wherein the hook member includes a looped end, which enables a line to connect thereto; wherein the line may include a line loop that is used to attach to a fishing line or other object.

The Preston Patent (U.S. Pat. No. 7,131,233) discloses a scent releasing fishing lure having multiple treble hooks attached to it. However, the fishing lure is not particularly suited for use with stinky cheese bait, which is specially designed to prolong the time with which a stinky cheese bait washes off.

The Poinski Patent Application Publication (U.S. Pub. No. 2005/0028424) discloses a scent dispensing fishing lure that has multiple treble hooks attached to the body of the lure. However, the fishing lure does not teach a tubular worm body that enables water to pass across the exterior such that ribs prolong the time with which a stinky cheese bait remains whilst being pulled through water.

The Gilbert Patent (U.S. Pat. No. 6,922,937) discloses a fishing lure that is filled with a scented material to attract fish and also having attached multiple treble hooks. However, the lure does not utilize a worm body that includes a series of ribs along a length, and which enables water to pass across the exterior for prolonging the time the stinky cheese bait remains.

The Sebastiani Patent (U.S. Pat. No. 6,412,214) discloses a fish attracting lure with multiple treble hooks attached to the body of the lure. Again, the lure does not utilize a worm body that has the shape and functionality of the worm body at bar.

The Wilson Patent (U.S. Pat. No. 5,603,182) discloses a dip bait worm lure with an attached treble hook for use in catching catfish. Again, the dip bait worm lure does not utilize a worm body that has the shape and functionality of the worm body at bar.

The Sims et al. Patent (U.S. Pat. No. Des. 463,004) illustrates a design for a fishing lure with multiple treble hooks attached to it, which does not feature a worm body that includes a plurality of ribs along a length.

While the above-described devices fulfill their respective and particular objects and requirements, they do not describe a multiple hook catfish dip worm that includes a worm body of tubular construction, and features a plurality of ribs along a length; wherein the worm body is made of a highly flexible material, and when dipped into a stinky cheese bait utilizes said ribs to prolong the time with which the stinky cheese bait resides before washing off in the water being fished; wherein the worm body includes a hook member that is concentrically aligned with and spans along the length of the worm body; wherein treble hooks extend radially from the hook member, and exit through the worm body; wherein the worm body includes the treble hooks at various locations along the length of the worm body; wherein the hook member includes a looped end, which enables a line to connect thereto; wherein the line may include a line loop that is used to attach to a fishing line or other object. In this regard, the multiple hook catfish dip worm departs from the conventional concepts and designs of the prior art.

SUMMARY OF THE INVENTION

The multiple hook catfish dip worm is constructed of a worm body that is particularly adapted to prolong adhesion of stinky cheese bait that is otherwise washed off of during use in water as a fishing lure. The worm body is of tubular construction, and features a plurality of ribs along a length, and is made of a highly flexible material, and when dipped into a stinky cheese bait utilizes said ribs to prolong the time with which the stinky cheese bait resides before washing off in the water being fished. The worm body includes a hook member that is concentrically aligned with and spans along the length of the worm body. Treble hooks extend radially from the hook member, and exit through the worm body. The worm body includes the treble hooks at various locations along the length of the worm body, and increases the likelihood of hooking a fish biting the worm body. The hook member includes a looped end, which enables a line to connect thereto.

It is an object of the invention to provide a catfish dip worm lure that utilizes a worm body that when dipped into stinky cheese bait shall prolong the effective life of the stinky cheese bait while providing treble hooks that increase the overall efficiency of hooking a biting fish onto said lure.

A further object of the invention is to provide a worm body that is constructed of a flexible material, which includes a plurality of ribs along a length.

Another object of the invention is to connect the treble hooks to a hook member that is located inside of the worm body, and through which all hooks extend to provide multiple locations with which to hook a fish that is biting at the lure.

These together with additional objects, features and advantages of the multiple hook catfish dip worm will be readily apparent to those of ordinary skill in the art upon reading the following detailed description of presently preferred, but nonetheless illustrative, embodiments of the multiple hook catfish dip worm when taken in conjunction with the accompanying drawings.

In this respect, before explaining the current embodiments of the multiple hook catfish dip worm in detail, it is to be understood that the multiple hook catfish dip worm is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the multiple hook catfish dip worm.

It is therefore important that the claims be regarded as including such equivalent construction insofar as they do not depart from the spirit and scope of the multiple hook catfish dip worm. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
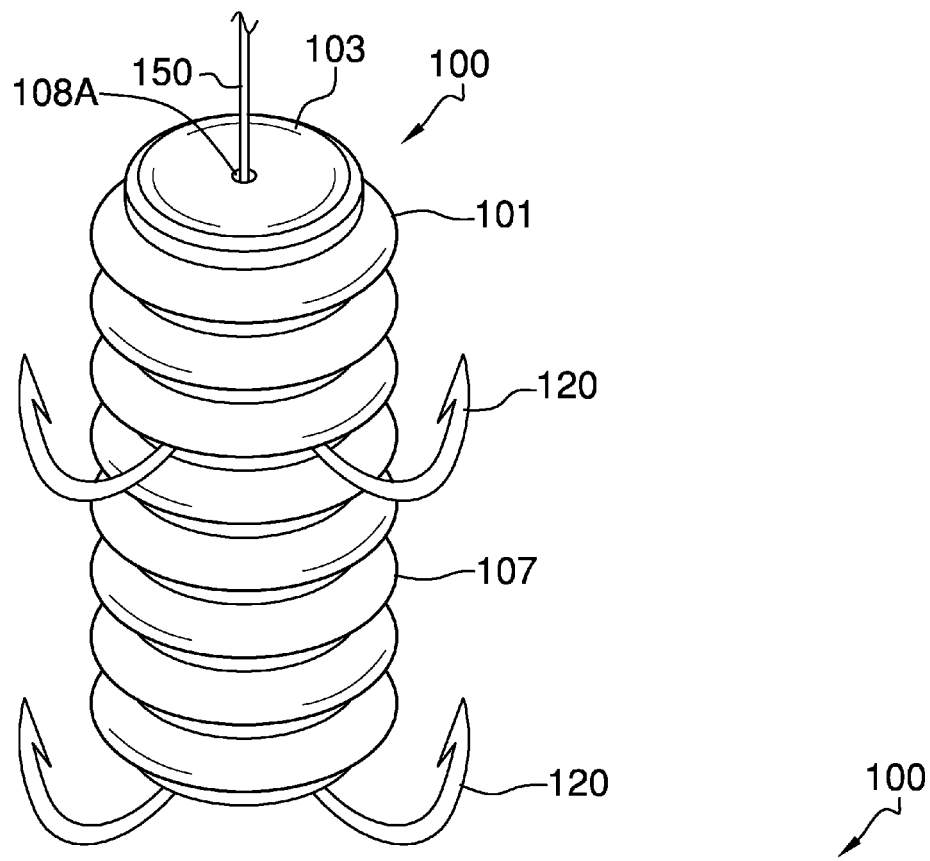
FIG. 1 illustrates a perspective view of the multiple hook catfish dip worm by itself.
Figure 2:
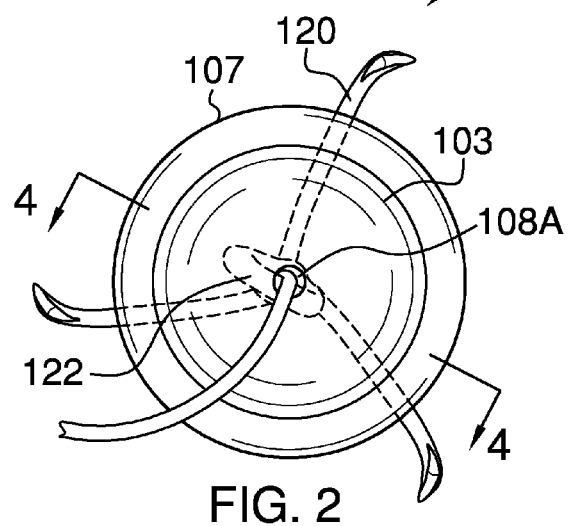
FIG. 2 illustrates a top view of the multiple hook catfish dip worm by itself.
Figure 3:
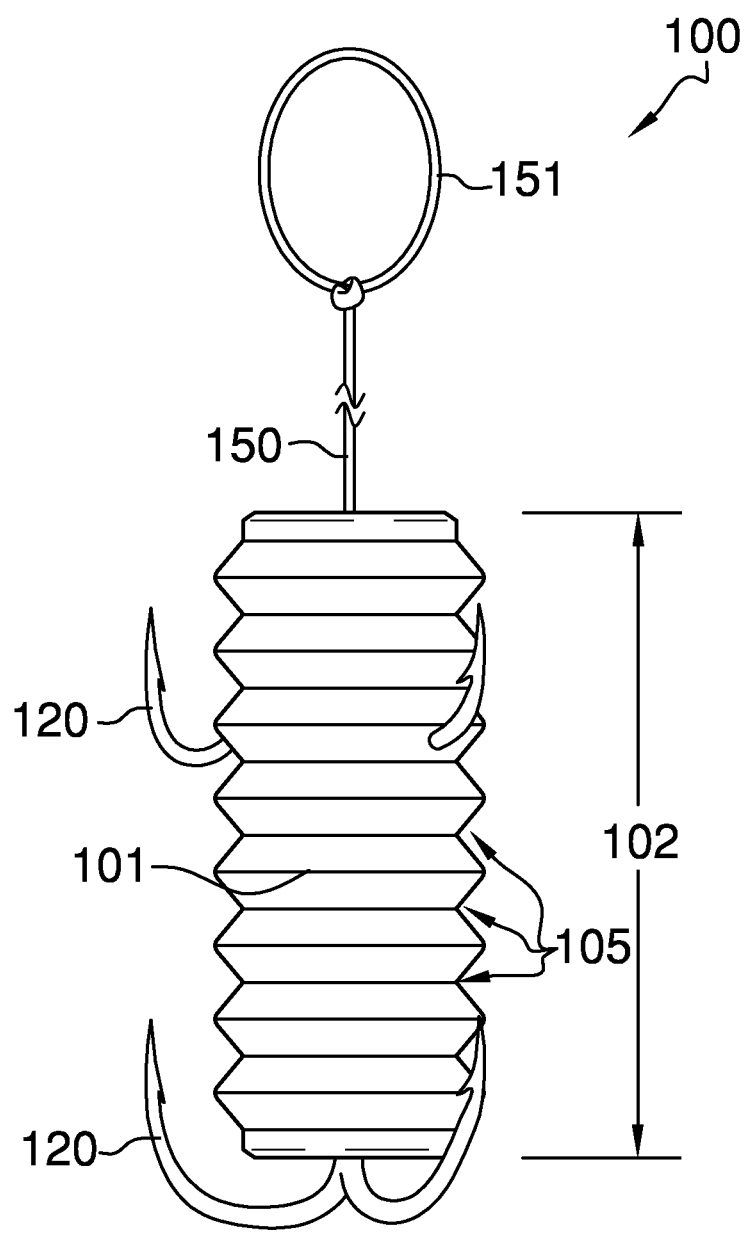
FIG. 3 illustrates a side view of the multiple hook catfish dip worm in which a line exits from the top.
Figure 4:
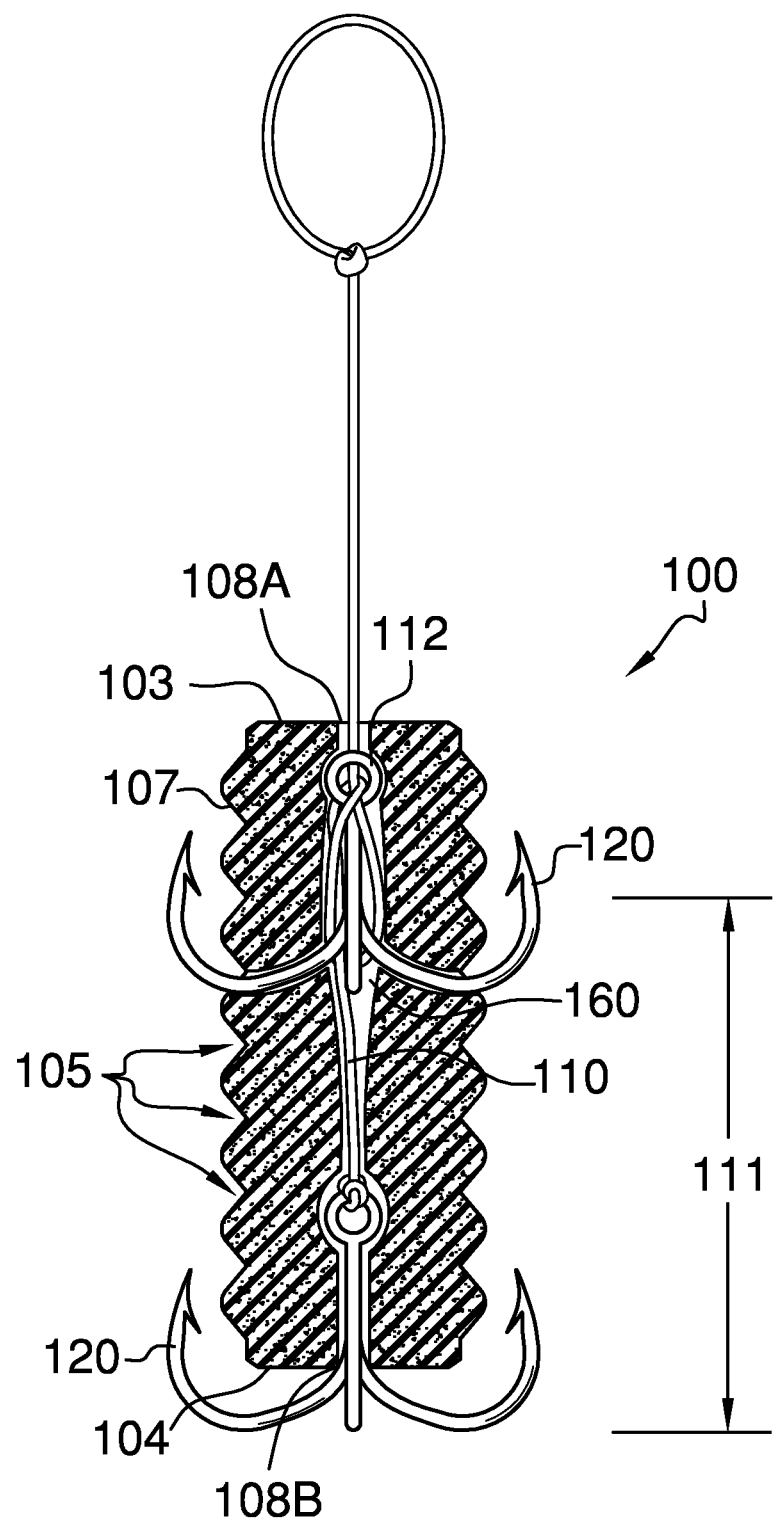
FIG. 4 illustrates a cross-sectional view along line 4-4 in FIG. 2, and depicting the interior construction of the multiple hook catfish dip worm.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations.

All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-8. A multiple hook catfish dip worm 100 (hereinafter invention) includes a worm body 101 further defined as a hollowed cylinder, a length 102, having a first surface 103, and a distally opposite second surface 104 the first surface 103 and second surface 104 each being flat and planar and extending perpendicular to the length 102 of the worm body 101. The worm body includes a plurality of equally-spaced ribs 105 that span across the length 102 of the worm body 101. The worm body is constructed of a flexible material, such as a plastic or rubber, and is thin-walled. The worm body 101 is further defined with an exterior surface 107. The worm body 101 also includes a first opening 108A and a second opening 108B. The first opening 108A is located on the first surface 103, whereas the second opening 108B is located on the second surface 104. In referencing FIG. 4, the first opening 108A and the second opening 108B extend through the entire length 102 of the worm body 101. The first opening 108A and the second opening 108B provide fluid communication to form a cavity 160 inside of the worm body 101.

Figure 5:
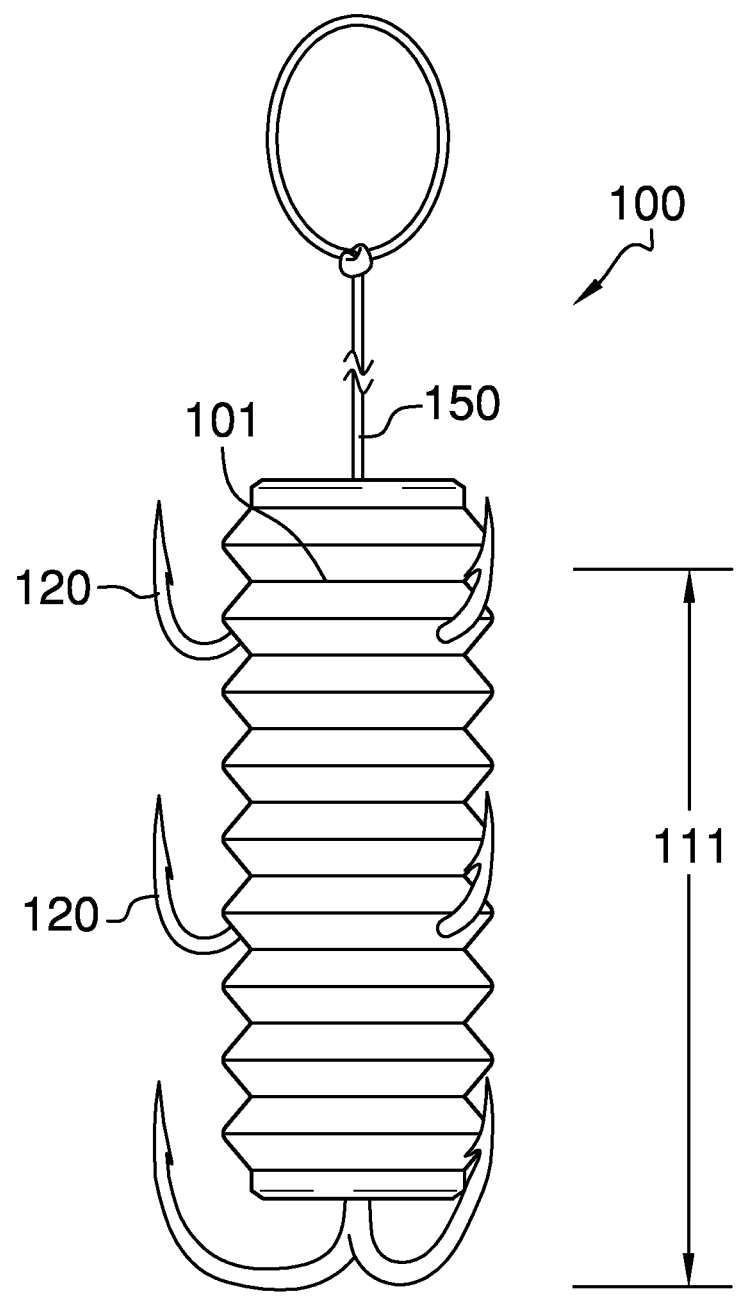
FIG. 5 illustrates a side view of the multiple hook catfish dip worm in which multiple treble hooks are provided along the length of the worm body.
Figure 6:
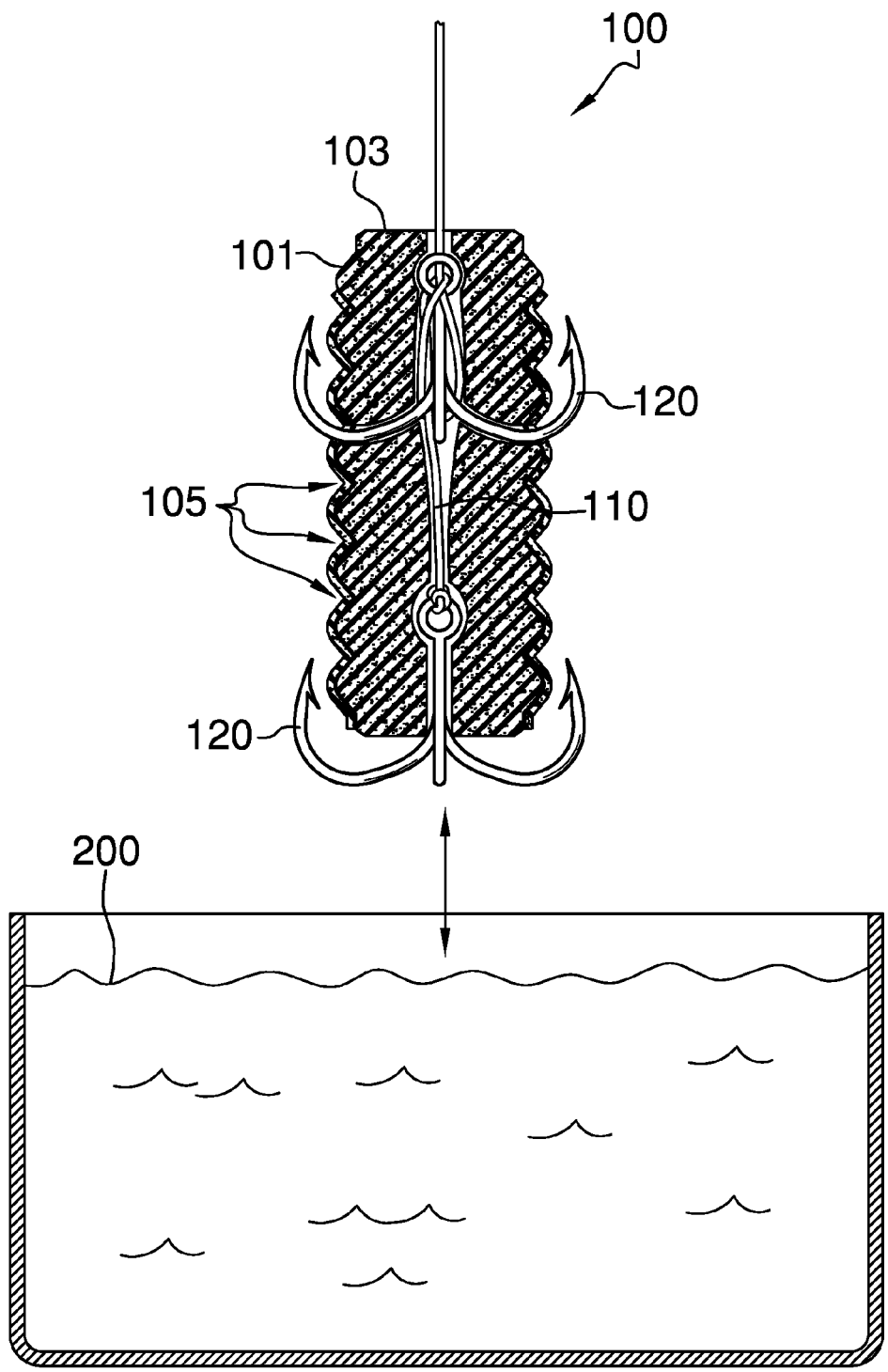
FIG. 6 illustrates the multiple hook catfish dip worm being dipped into sticky cheese bait, which coats the outer surface of the worm body.

The invention includes a hook member 110 that is centrally aligned within the worm body 101. The hook member 110 includes treble hooks 120 that are spaced along a hook member length 111. One of the treble hooks 120 is located at the second opening 108B whereas other treble hooks 120 extend through the worm body 101. Referring to FIG. 5, the treble hooks 120 are equally spaced along the hook member length 111, and are aligned with respect to one another in order to form rows of hooks.

The hook member 110 is further defined with a hook member eyelet 112, which is positioned inside of the worm body 101, and which is used to tie the invention 100 to a line 150. It shall be noted that the line 150 may feature a line loop 151 at a distal end of the line 150, which is of an undefined length.

The invention 100 is used by dipping or submerging the worm body 101 into a stinky cheese bait 200. The formulation of stinky cheese bait varies, but a common factor is that the smellier the better. Coating the worm body 101 with the stinky cheese bait 200, which is then used to lure fish 300 to the invention 100. The stinky cheese bait 200 will wash off of the worm body 101 when inserted into water while fishing.

It shall be noted that the ribs 105 enable the stinky cheese bait 200 to cover a greater surface area when compared to a flattened cylinder shaped version of the worm body 101. The ribs 105 prolong the amount of time that the stinky cheese bait 200 remains on the exterior surface 107 of the worm body 101. Moreover, the stinky cheese bait 200 is able to coat the first surface 103, the second surface 104, the first opening 108A, the second opening 108B, and the exterior surface 107.

Figure 7:
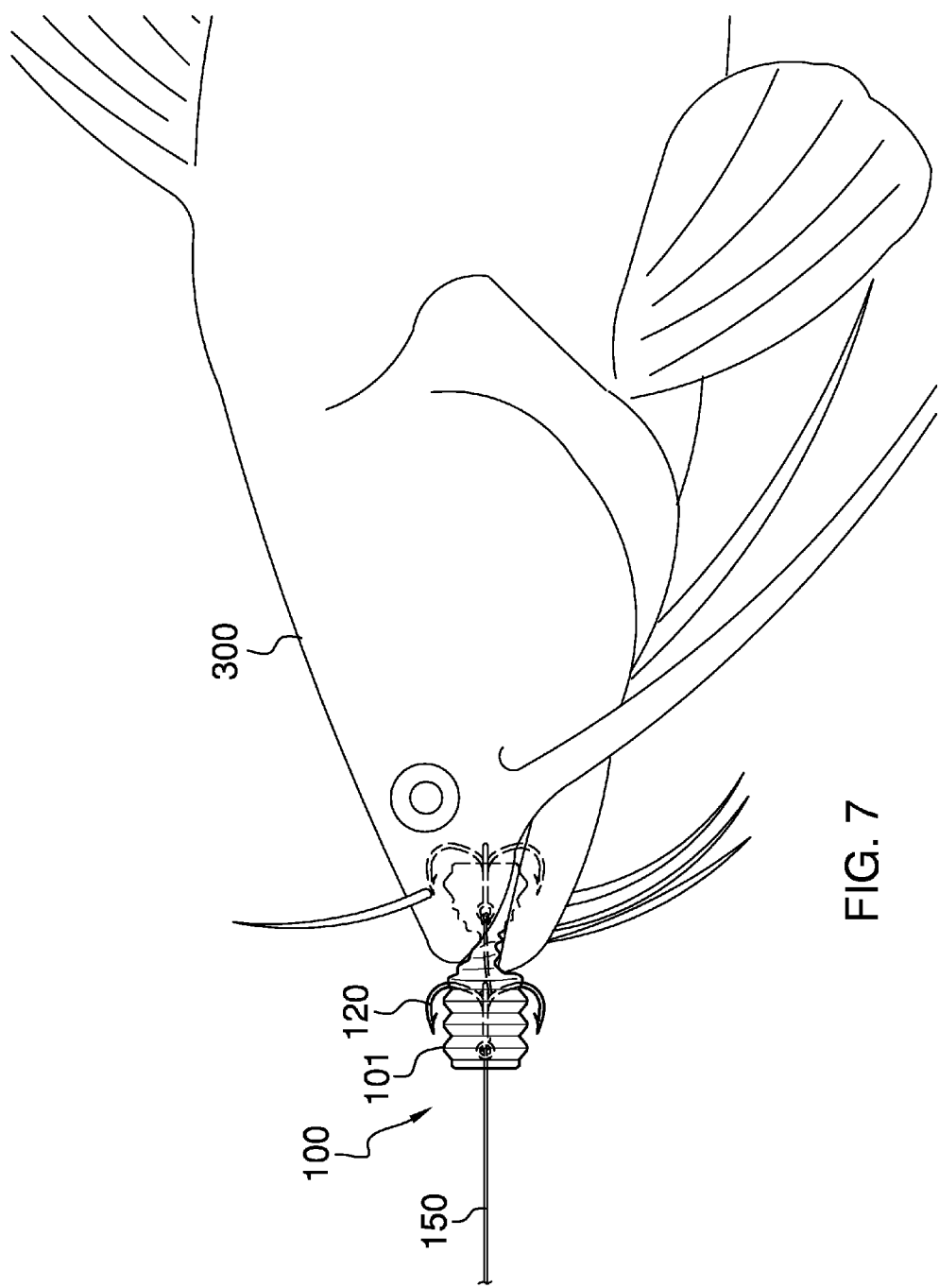
FIG. 7 illustrates the multiple hook catfish dip worm being hooked to a catfish, and further detailing the worm body being flexed during the bite of the fish.
Figure 8:
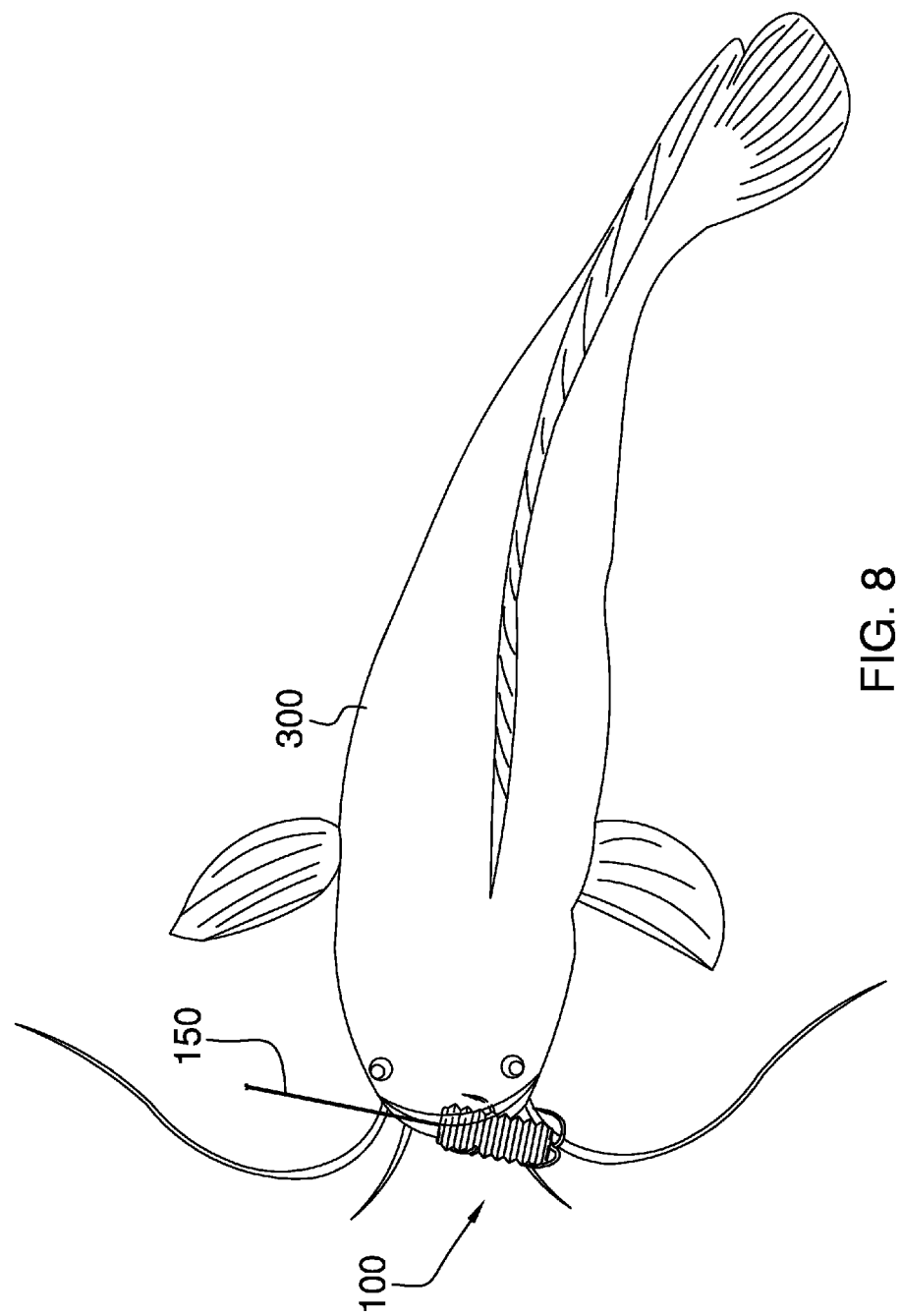
FIG. 8 illustrates another view of the multiple hook catfish dip worm hooked to the catfish.

Referring to FIG. 7, the invention 100 is able to hook to the fish 300 via the treble hooks 120, which increases the overall efficiency of the invention 100. Moreover, the worm body 101 is able to flex during the biting process of the fish 300. When the worm body 101 flexes during fish bite, the treble hooks 120 are further extended with respect to the exterior surface 107 of the worm body 101.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A multiple hook catfish dip worm comprising:
   a worm body of a cylinder shape, which includes a plurality of equally spaced ribs along a length of the worm body;
   wherein a hook member extends concentrically within said worm body;
   wherein a plurality of treble hooks extend radially from the hook member;
   wherein the worm body is configured to be coated with a stinky cheese bait, which lures a fish thereto, and upon a fish bite at least one barb of said plurality of treble hooks shall hook said fish;
   wherein the worm body is further defined with a first flat and planar surface, and a second flat and planar surface; wherein the first surface and the second surface are located at distal ends of the worm body and extend perpendicular to the length of the worm body, which define the length of the worm body therebetween; wherein the first surface includes a first opening; wherein the second surface includes a second opening; wherein the first opening and the second opening connect via a cavity, which spans the length of the worm body;
   wherein the plurality of equally spaced ribs span across the length of the worm body; wherein the worm body is constructed of a flexible material;
   wherein one of the treble hooks is located at the second opening whereas an other of the plurality of treble hooks is located between the one of the treble hooks and the first surface, the other of the plurality of treble hooks extends through the cavity and outwardly from the exterior surface of the worm body.

2. The multiple hook catfish dip worm as described in claim 1 wherein the worm body is further defined with an exterior surface; wherein the stinky cheese bait coats the first opening and the second opening of the first surface and the second surface when the stinky cheese bait is dipped into the stinky cheese bait; wherein the stinky cheese bait simultaneously coats the exterior surface when the worm body is dipped into the stinky cheese bait.

3. The multiple hook catfish dip worm as described in claim 2 wherein the plurality of treble hooks is further defined with a hook member eyelet, which is positioned inside of the worm body, and which ties the dip worm to a line.

4. The multiple hook catfish dip worm as described in claim 3 wherein the line includes a line loop at a distal end of the line, which is of an undefined length.

5. A multiple hook catfish dip worm comprising:
   a worm body of a cylinder shape, which includes a plurality of equally spaced ribs along a length of the worm body;
   wherein a hook member extends concentrically within said worm body;
   wherein a plurality of treble hooks extend radially from the hook member;
   wherein the worm body is configured to be coated with a stinky cheese bait, which lures a fish thereto, and upon a fish bite at least one barb of said plurality of treble hooks shall hook said fish;
   wherein the worm body is further defined with a first flat and planar surface, and a second flat and planar surface; wherein the first surface and the second surface are located at distal ends of the worm body and extend perpendicular to the length of the body, which defines the length of the worm body; wherein the first surface includes a first opening; wherein the second surface includes a second opening; wherein the first opening and the second opening connect via a cavity, which spans the length of the worm body;
   wherein the plurality of equally spaced ribs span across the length of the worm body; wherein the worm body is constructed of a flexible material;
   wherein the worm body is further defined with an exterior surface; wherein the stinky cheese bait coats the first opening and the second opening of the first surface and the second surface when the worm body is dipped into the stinky cheese bait; wherein the stinky cheese bait simultaneously coats the exterior surface when the worm body is dipped into the stinky cheese bait;
   wherein the hook member is centrally aligned with the worm body; wherein one of the treble hooks is located at the second opening whereas an other of the plurality of treble hooks is located between the one of the treble hooks and the first surface, the other of the plurality of treble hooks extends through the cavity and outwardly from the exterior surface of the worm body.

6. The multiple hook catfish dip worm as described in claim 5 wherein the plurality of treble hooks is further defined with a hook member eyelet, which is positioned inside of the worm body, and which ties the dip worm to a line.

7. The multiple hook catfish dip worm as described in claim 6 wherein the line includes a line loop at a distal end of the line, which is of an undefined length.

* * * * *